(12) United States Patent
Perry et al.

(10) Patent No.: US 8,746,215 B2
(45) Date of Patent: Jun. 10, 2014

(54) SAMPLE TUBE STRUCTURE FOR AUTOMOTIVE FUEL TANK LEAK DETECTION

(75) Inventors: Paul D. Perry, Chatham (CA); Adrian O. Crisan, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 436 days.

(21) Appl. No.: 13/310,295

(22) Filed: Dec. 2, 2011

(65) Prior Publication Data
US 2013/0139792 A1 Jun. 6, 2013

(51) Int. Cl.
*F02M 33/02* (2006.01)
*F02M 33/04* (2006.01)

(52) U.S. Cl.
USPC .............. 123/518; 123/198 D; 701/114

(58) Field of Classification Search
USPC .............. 123/516, 518–520, 198 D, 495; 701/102, 114; 73/114.43, 114.39
See application file for complete search history.

(56) References Cited

U.S. PATENT DOCUMENTS

| | | | |
|---|---|---|---|
| 5,868,120 A * | 2/1999 | Van Wetten et al. | 123/518 |
| 6,405,718 B1 | 6/2002 | Yoshioka | |
| 6,460,566 B1 | 10/2002 | Perry et al. | |
| 2001/0032626 A1 | 10/2001 | Fabre | |
| 2004/0089062 A1 | 5/2004 | Matsubara | |
| 2009/0007660 A1 * | 1/2009 | Van Ee | 73/299 |
| 2009/0126694 A1 | 5/2009 | Ritz | |

FOREIGN PATENT DOCUMENTS

EP 2014904 A2 1/2009

OTHER PUBLICATIONS

International Search Report & Written Opinion in PCT/US2012/067263 Mar. 26, 2013.

* cited by examiner

*Primary Examiner* — Mahmoud Gimie

(57) ABSTRACT

A vapor management system (10) includes a sense tube (47) disposed in a fuel tank (12). A differential pressure sensor (17) has one side connected to the sense tube and another side connected to a vapor cavity so that the pressure sensor can measure a differential pressure (DP) between a volume of the vapor cavity and a volume of the sense tube containing liquid fuel. A temperature sensor (26) is in the vapor cavity. A processor 1) receives DP and T measurements at certain time intervals to determine the temperature at time zero ($T_0$), the differential pressure at time zero ($DP_0$), the temperature at a certain time ($T_t$), and the differential pressure at a certain time ($DP_t$), and 2) when ($T_t$–$T_0$) is greater than a certain value, compares $DP_t$ to a certain differential pressure value.

18 Claims, 3 Drawing Sheets

SAMPLE TUBE STRUCTURE FOR AUTOMOTIVE FUEL TANK LEAK DETECTION

FIELD

This invention relates to vapor management systems of vehicles and, more particularly, to a leak detection method and system for high pressure automotive fuel tank.

BACKGROUND

A known fuel system for vehicles with internal combustion engines includes a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, there is a need to avoid releasing fuel vapors into the atmosphere, and to provide an apparatus and a method for performing a leak diagnostic, so as to comply with these standards.

An automotive leak detection on-board diagnostic (OBD) determines if there is a leak in the vapor management system of an automobile. The vapor management system can include the fuel tank headspace, the canister that collects volatile fuel vapors from the headspace, a purge valve and all associated hoses. These systems however, require pressure to be bled-off before tank diagnostics can be run.

In some vehicle applications (e.g., plug-in hybrid) the fuel tank is held at elevated pressures in order to suppress the evaporation of gasoline, and therefore reduce the need to store and process any vented gasoline vapor.

Thus, there is a need for a diagnostic method and system to detect vapor leakage in a high pressure fuel tank environment, without having to bleed off the pressure.

SUMMARY

An object of the invention is to fulfill the need referred to above. In accordance with the principles of an embodiment, this objective is achieved by a method of determining a leak in a vapor management system of a vehicle. The system includes a fuel tank having liquid fuel therein and a vapor cavity above the liquid fuel; a vapor collection canister; a tank pressure control valve between the tank and canister and defining a high pressure side, including the fuel tank, and a low pressure side, including the canister; a vacuum source; a purge valve between the canister and vacuum source; a leak detection valve connected with the canister; and a processor. The method provides a sense tube in the tank. The sense tube has an open end disposed near a bottom of the tank such that fuel in the tank may enter the open end. A differential pressure sensor has one side thereof connected to the sense tube and another side thereof connected to the vapor cavity so that the pressure sensor can measure a differential pressure (DP) between a volume of the vapor cavity and a volume of the sense tube containing the liquid fuel. A temperature sensor is provided in the vapor cavity, with signals from the pressure sensor and temperature sensor being received by the processor. The differential pressure (DP) and the temperature (T) are measured at certain time intervals to determine the temperature at time zero ($T_0$), the differential pressure at time zero ($DP_0$), the temperature at a certain time ($T_t$), and the differential pressure at a certain time ($DP_t$), and when ($T_t - T_0$) is greater than a certain value, $DP_t$ is compared to a certain differential pressure value.

In accordance with another aspect of an embodiment, a vapor management system for a vehicle includes a fuel tank having liquid fuel therein and a vapor cavity above the liquid fuel; a vapor collection canister; a tank pressure control valve connected between the tank and canister, the control valve defining a high pressure side, including the fuel tank, and a low pressure side, including the canister; a vacuum source; a purge valve connected between the canister and vacuum source; a leak detection valve connected with the canister, and a processor. A sample tube structure has a sense tube disposed in the tank with the sense tube having an open end disposed near a bottom of the tank such that fuel in the tank may enter the open end. A differential pressure sensor has one side thereof connected to the sense tube and another side thereof connected to the vapor cavity so that the pressure sensor can measure a differential pressure (DP) between a volume of the vapor cavity and a volume of the sense tube containing the liquid fuel. A temperature sensor is provided in the vapor cavity, with signals from the pressure sensor and temperature sensor being received by the processor. The processor is constructed and arranged 1) to receive a differential pressure (DP) measurement and a temperature (T) measurement at certain time intervals to determine the temperature at time zero ($T_0$), the differential pressure at time zero ($DP_0$), the temperature at a certain time ($T_t$), and the differential pressure at a certain time ($DP_t$), and 2) when ($T_t - T_0$) is greater than a certain value, to compare $DP_t$ to a certain differential pressure value.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, in which.

DETAILED DESCRIPTION OF EXEMPLARY EMBODIMENTS

Figure 1:
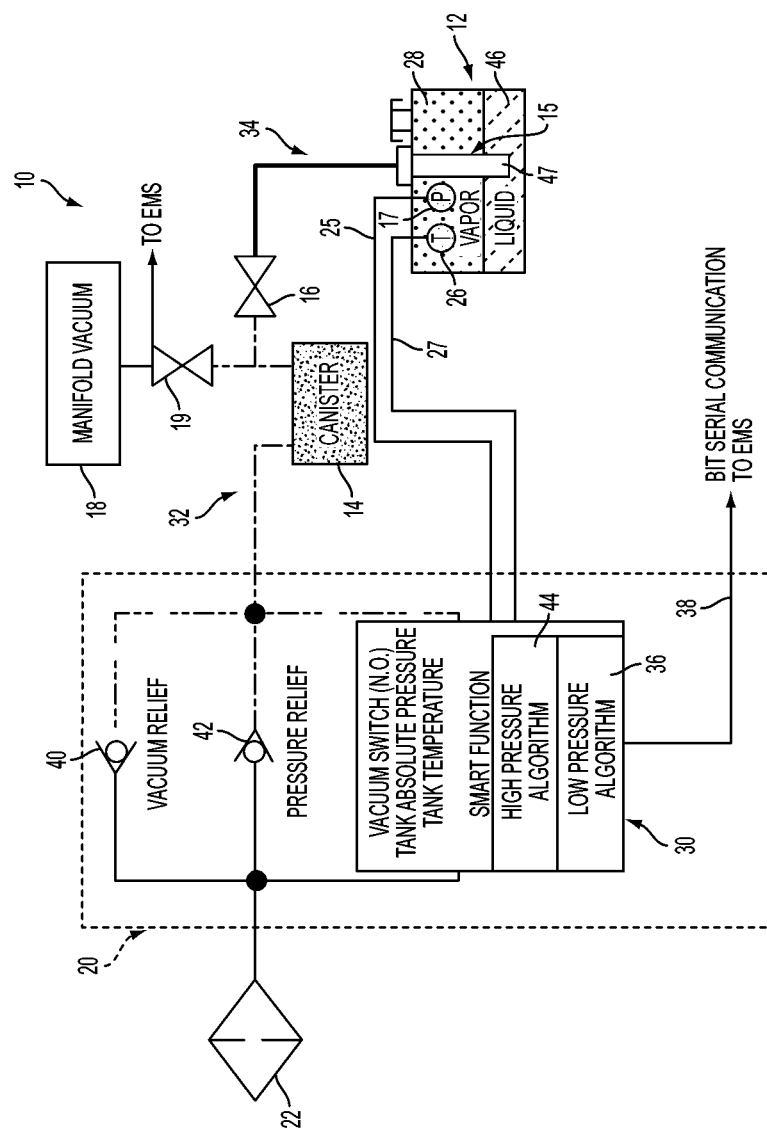
FIG. 1 is a schematic illustration showing a diagnostic vapor management system for detecting vapor leakage in a high pressure fuel tank environment, according to an embodiment of the present invention.

Referring to FIG. 1, a diagnostic vapor management system for a high pressure fuel tank of a vehicle is shown, generally indicated at 10, in accordance with an embodiment. The high pressure (sometimes called "non-integrated") system 10 comprises of a fuel tank, generally indicated at 12, a charcoal, vapor collection canister 14, a tank pressure control valve 16, and a sample tube structure, generally indicated at 15. The sample tube structure 15 may be connected with the control valve 16, and has a portion disposed in the tank 12. The sample tube structure 15 is connected to one side of a differential pressure sensor 17 disposed in a vapor cavity 28 of the tank 12. The system 10 also includes a vacuum source 18, such as an intake manifold of the engine, a purge valve 19 between the canister 14 and vacuum source 18, a leak detection valve, generally indicated at 20, and a filter 22. A temperature sensor 26 is also located within the vapor cavity 28 of the fuel tank 12. In the embodiment, the pressure sensor 17 and temperature sensor 26 are electrically connected to a processor, generally indicated at 30, within the leak detection valve 20. If desired, the processor 30 can be provided remote from the leak detection valve 20.

It is understood that volatile liquid fuels, e.g., gasoline, can evaporate under certain conditions, e.g., rising ambient temperature, thereby generating fuel vapor. Fuel vapors that are generated within headspace 28 of tank 12 are collected in the vapor collection canister 14. At times conducive to canister purging, the collected vapors are purged from canister 14 to the engine (not shown) through the purge valve 19. The canister 14 vents to atmosphere through the particulate filter 22, allowing engine manifold vacuum 18 to draw air into and through canister 14 where collected vapors entrain with the air flowing through the canister and are carried into the engine intake system, and ultimately into engine where they are combusted.

The system 10 is divided into two parts by the tank pressure control valve 16. A low pressure side, generally indicated at 32, is shown in dot-dashed lines in FIG. 1 and includes the canister 16, while a high pressure side, generally indicated at 34, is shown by a thick black line in FIG. 1 and includes the fuel tank 12. The system 10 is preferably for use in a plug-in hybrid tank system.

Leak diagnostic on the low pressure side 32 is conducted by the leak detection valve 20, using a first, or low pressure algorithm 36 executed by the processor 30, in a manner described in U.S. Pat. No. 7,004,014, the content of which is hereby incorporated by reference into this specification. In particular, in the course of cooling that is experienced by the system 10, e.g., after the engine is turned off, a vacuum is naturally created by cooling the fuel vapor and air, such as in the headspace 28 of the fuel tank 12 (when valve 16 is open) and in the charcoal canister 14. The existence of a vacuum at a predetermined pressure level indicates that the integrity of the system 10 is satisfactory. Thus, signaling 38, sent to an engine management system (EMS), is used to indicate the integrity of the system 10, e.g., that there are no appreciable leaks. Subsequently, a vacuum relief valve 40 at a pressure level below the predetermined pressure level, protects the canister 14 and hoses by preventing structural distortion as a result of stress caused by vacuum in the system 10.

After the engine is turned off, the pressure relief or blow-off valve 42 allows excess pressure due to fuel evaporation to be vented, and thereby expedite the occurrence of vacuum generation that subsequently occurs during cooling. The pressure blow-off 42 allows air within the system 10 to be released while fuel vapor is retained. Similarly, in the course of refueling the fuel tank 12, the pressure blow-off 42 allows air to exit the fuel tank 12 at a high rate of flow if the valve 16 is open.

While the high pressure side 34 could be equalized with the low pressure side 32 for the purpose of conducting a leak check on the entire system 10, this would eliminate the advantage of holding fuel tank at elevated pressure. The pressure sensor 17 and temperature sensor 26 allow a second, or high pressure algorithm 44 executed by the processor 30 to detect a leak on the high pressure side 34 without the need to vent the tank pressure through the canister 14, as explained below.

Figure 2:
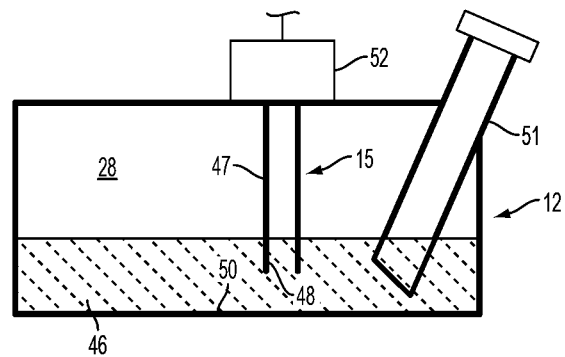
FIG. 2 is an enlarged view of the sample tube structure of FIG. 1 shown mounted to the fuel tank.

In accordance with an embodiment and as best shown in FIG. 2, the tank 12 is divided into two parts. The vapor cavity 28 is the area above the liquid gasoline 46. The sample tube structure 15 includes a cylindrical sense tube 47 having an open end 48 that is positioned such that the open end 48 is close to the bottom 50 of the tank 12. The sense tube 47 is constructed and arranged such that the liquid gasoline 46 can enter from the bottom (open end 48) only. The tank filler tube 51 is also shown.

Figure 3:
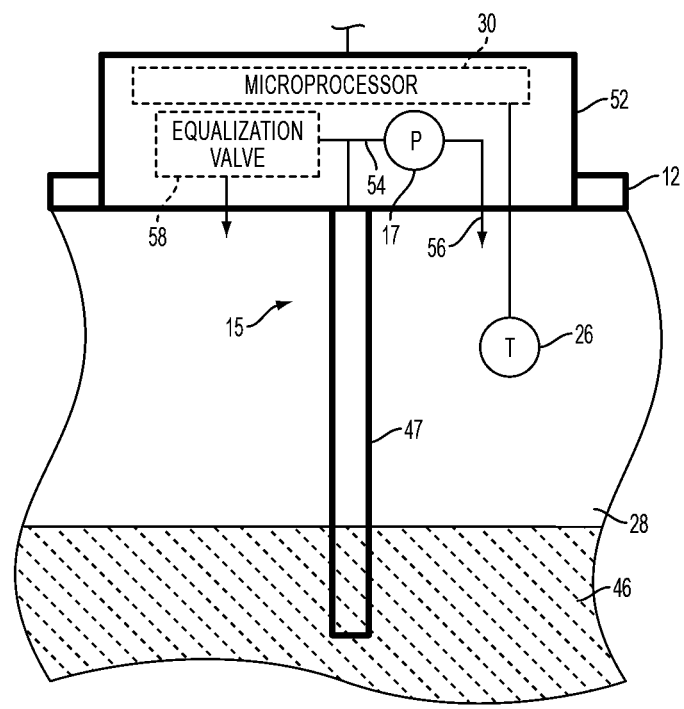
FIG. 3 is a view of the sample tube structure of another embodiment, shown mounted to a portion of a fuel tank.

FIG. 3 shows an example embodiment of the sample tube structure 15. The sample tube structure 15 includes a housing 52 coupled to the tank 12 so as to extend outside of the tank 12. The sense tube 47 is connected to one side 54 of the differential pressure sensor 17, which can be provided in the housing 52 or in the vapor cavity 28. The other side 56 of the pressure sensor 17 is connected to the vapor cavity 28 so that the pressure sensor 17 measures the difference in pressure between the volume of the vapor cavity 28 and the volume of the sense tube 47 containing the liquid gasoline 46. The temperature sensor 26 is mounted so as to measure the temperature in the fuel tank vapor space 28. The sample tube structure 15 also includes an optional equalization valve 58 disposed in the housing 52. The equalization valve 58 can be used to equalize the pressure between the sense tube 47 and the tank vapor cavity 28 at the start of the diagnostic test. In the embodiment of FIG. 2, the processor 30 is shown to be disposed in the housing 52 of the sample tube structure 15. However, as noted above, the processor 30 can be disposed remotely (as in FIG. 1).

An important feature of the sample tube structure 15 is that the fuel and air inside the sense tube 47 is continually being 'refreshed' by the fuel in the main tank 12. This takes place due not only agitation, but during the process of refueling from the near empty condition, when the bottom of the sense tube 47 is not covered, a direct air passage is created. All of these actions guarantee that the fuel and air composition in the sense tube 47 is identical to that of the main tank 12.

There are two basic methods of using the sample tube structure 15 to run a leak diagnostic. The first method starts with the pressure and liquid level equal in the two volumes as shown in FIG. 2. The second method starts with the pressure inside the sense tube 47 at a different level than in the tank 12.

Figure 4:
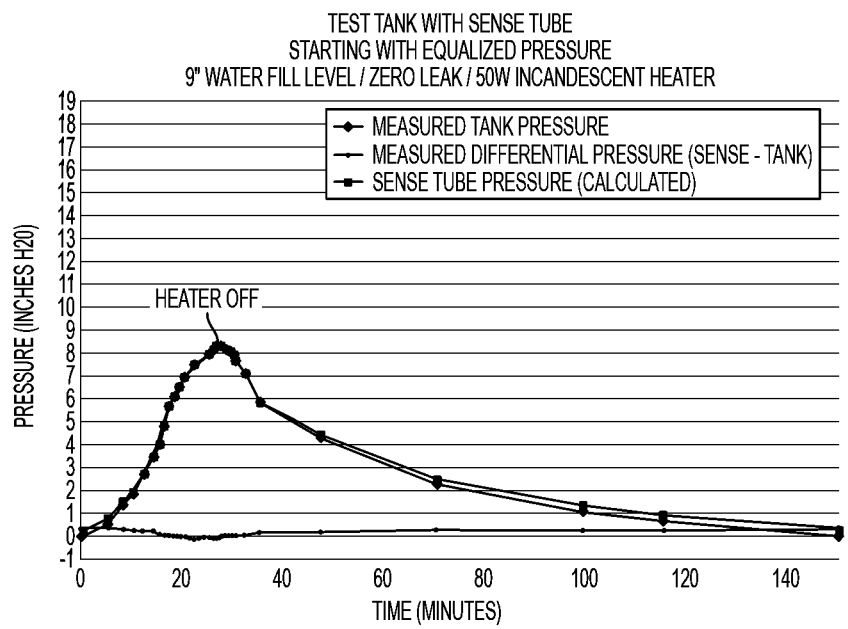
FIG. 4 is a graph, using a method of one embodiment, showing that with zero leakage, the differential pressure remains zero.

The first method that starts with equalized pressure is as follows. At the start of the diagnostic, the equalization valve 58 is opened momentarily to balance the pressure and liquid level in the sense tube 47 and the main tank 12. This condition is shown in FIG. 2. The differential pressure sensor 17 should now read zero at the start of the test. At some regular interval, e.g., every 10 minutes, the temperature (T) and differential pressure (DP) are continually measured to determine the temperature at time zero ($T_0$), the differential pressure at time zero ($DP_0$), the temperature at a certain time ($T_t$), and the differential pressure at a certain time ($DP_t$). If the system 10 has zero leakage, the pressure in the tank 12 should vary with respect to the temperature in a predictable and repeatable fashion. The pressure inside the sense tube 47 will also vary with respect to the temperature in exactly the same measure since the air vapor and liquid fuel composition inside and outside the sense tube 47 are identical. If there is zero leakage, the differential pressure sensor 17 will always measure ZERO. This behavior is shown in FIG. 4 on a test tank 12 that is first heated then cooled. If leakage is present in the fuel tank, then the differential pressure will be NON-ZERO. To ensure that a valid test condition is available, a minimum temperature change should be achieved before the pressure results are evaluated.

In summary, the following logic describes the first leak diagnostic with equalization:

If $(T_t-T_0) \leq x$ then NO TEST POSSIBLE

If $(T_t-T_0) \geq x$ AND $(DP_t \neq 0)$ THEN Leak Detected

If $(T_t-T_0) \geq x$ AND $(DP_t=0)$ THEN Leak Test PASS

Figure 5:
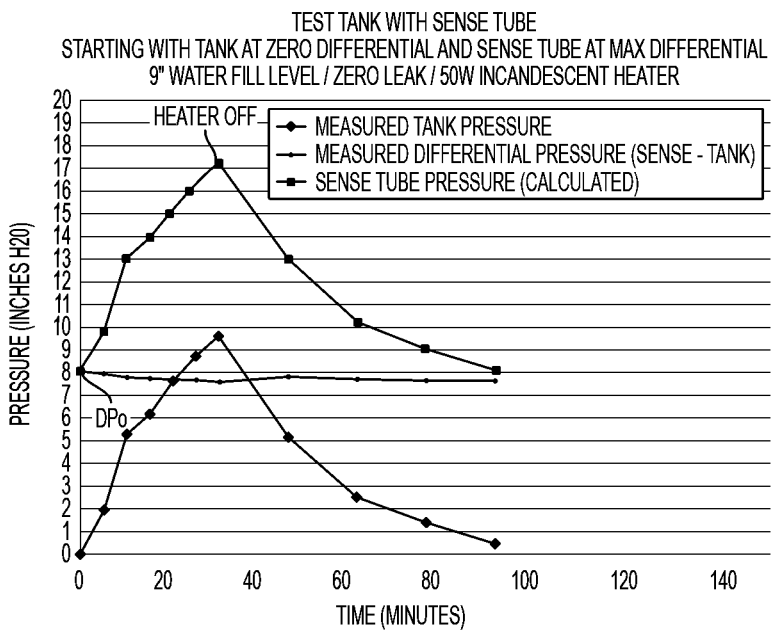
FIG. 5 is a graph, using a method of another embodiment, showing that with zero leakage, the differential pressure remains at about 8 mbar.

An alternate, second method of using the sensing tube structure 15 to run a leak diagnostic can be performed when/if the pressure is not equalized at the start of the test. For this form of the test, the equalization valve 58 would not be required. This would simplify the hardware and reduce the chance of malfunction due to valve leakage or failure. The starting condition, $DP_0$, in FIG. 5 is subject to several variables, including tank fill level, fuel composition and temperature. However, the tank and the sense tube 47 are both subject to the same variables and thus, generally cancel these effects. At some regular interval, e.g., every 10 minutes, the temperature (T) and differential pressure (DP) are continually measured as above. If the system 10 has zero leakage, the pressure in the tank should vary with respect to the temperature in a predictable and repeatable fashion. The pressure inside the sense tube 47 will also vary with respect to the temperature in exactly the same measure. If the system 10 has zero leakage, then the differential pressure at some time (t) should equal the starting pressure, or in other words $DP_t=DP_0$. This is shown in FIG. 5 as the tank 12 is heated and then cooled.

In Summary, the following logic must be satisfied to complete a leak diagnostic:

If $(T_t-T_0) \leq x$ then NO TEST POSSIBLE

If $(T_t-T_0) \geq x$ AND $(DP_t \neq DP_0)$ THEN Leak Detected $(T_t-T_0) \geq x$ AND $(DP_t=DP_0)$ THEN Leak Test PASS Thus, the use of the sample tube structure 15 is effective in determining if a vapor leak occurs in a high pressure fuel tank environment, without the need to bleed-off pressure.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of determining a leak in a vapor management system of a vehicle, the system including a fuel tank having liquid fuel therein and a vapor cavity above the liquid fuel; a vapor collection canister; a tank pressure control valve between the tank and canister and defining a high pressure side, including the fuel tank, and a low pressure side, including the canister; a vacuum source; a purge valve between the canister and vacuum source; a leak detection valve connected with the canister; and a processor, the method comprising the steps of:

providing a sense tube in the tank, the sense tube having an open end disposed near a bottom of the tank such that fuel in the tank may enter the open end, providing a differential pressure sensor with one side thereof being connected to the sense tube and another side thereof being connected to the vapor cavity so that the pressure sensor can measure a differential pressure (DP) between a volume of the vapor cavity and a volume of the sense tube containing the liquid fuel, providing a temperature sensor in the vapor cavity, with signals from the pressure sensor and temperature sensor being received by the processor, measuring the differential pressure (DP) and the temperature (T) at certain time intervals to determine the temperature at time zero ($T_0$), the differential pressure at time zero ($DP_0$), the temperature at a certain time ($T_t$), and the differential pressure at a certain time ($DP_t$), and determining if ($T_t-T_0$) is greater than a certain value and if so, comparing $DP_t$ to a certain differential pressure value.

2. The method of claim 1, further comprising:

balancing the pressure and liquid fuel level in the sense tube and the fuel tank to ensure that the DP is equal to 0, and wherein $DP_t$ is compared to 0 differential pressure such that a leak is detected in the system when $DP_t \neq 0$.

3. The method of claim 2, wherein the step of balancing includes opening an equalization valve disposed between the tank and the sense tube.

4. The method of claim 1, wherein $DP_t$ is compared $DP_0$, such that a leak is detected in the system when $DP_t \neq DP_0$.

5. A vapor management system for a vehicle comprising:

a fuel tank having liquid fuel therein and a vapor cavity above the liquid fuel;

a vapor collection canister;

a tank pressure control valve connected between the tank and canister, the control valve defining a high pressure side, including the fuel tank, and a low pressure side, including the canister;

a vacuum source;

a purge valve connected between the canister and vacuum source;

a leak detection valve connected with the canister, a processor, a sample tube structure having a sense tube disposed in the tank, the sense tube having an open end disposed near a bottom of the tank such that fuel in the tank may enter the open end, a differential pressure sensor having one side thereof connected to the sense tube and another side thereof connected to the vapor cavity so that the pressure sensor can measure a differential pressure (DP) between a volume of the vapor cavity and a volume of the sense tube containing the liquid fuel, and a temperature sensor in the vapor cavity, with signals from the pressure sensor and temperature sensor being received by the processor, the processor being constructed and arranged 1) to receive a differential pressure (DP) measurement and a temperature (T) measurement at certain time intervals to determine the temperature at time zero ($T_0$), the differential pressure at time zero ($DP_0$), the temperature at a certain time ($T_t$), and the differential pressure at a certain time ($DP_t$), and 2) when ($T_t-T_0$) is greater than a certain value, to compare $DP_t$ to a certain differential pressure value.

6. The system of claim 5, wherein the processor is constructed and arranged to identify a leak in the system when $DP_t \neq DP_0$.

7. The system of claim 5, further comprising an equalization valve disposed between the tank and the sense tube constructed and arranged to balance the pressure and liquid fuel level in the sense tube and the fuel tank to ensure that the DP is equal to 0.

8. The system of claim 7, wherein the processor is constructed and arranged to identify a leak in the system when $DP_t \neq 0$.

9. The system of claim 7, wherein the equalization valve is provided in a housing of the sample tube structure, the housing being coupled to and extending outside of the tank.

10. The system of claim 9, wherein the processor is provided in the housing.

11. The system of claim 5, wherein the processor is part of the leak detection valve.

12. A vapor management system for a vehicle comprising:
a fuel tank;
means for collecting vapor;
means for controlling pressure connected between the tank and the means for collecting vapor, the means for controlling pressure defining a high pressure side, including the fuel tank, and a low pressure side, including the means for collecting vapor;
means for providing a vacuum source;
means for purging connected between the means for collecting vapor and the means for providing a vacuum source;
a leak detection valve connected with the means for collecting vapor,
means for processing data,
means, disposed in the tank, for receiving liquid fuel in the tank,
means for sensing differential pressure, with one side thereof connected to the means for receiving liquid fuel and another side thereof connected to the vapor cavity so that the pressure sensor can measure a differential pressure (DP) between a volume of the vapor cavity and a volume of the means for receiving liquid fuel, and
means for sensing temperature in the vapor cavity, with signals from the means for sensing pressure and the means for sensing temperature being received by the means for processing data,
the means for processing data being constructed and arranged 1) to receive a differential pressure (DP) measurement and a temperature (T) measurement at certain time intervals to determine the temperature at time zero ($T_0$), the differential pressure at time zero ($DP_0$), the temperature at a certain time ($T_t$), and the differential pressure at a certain time ($DP_t$), and 2) when ($T_t-T_0$) is greater than a certain value, to compare $DP_t$ to a certain differential pressure value.

13. The system of claim 12, wherein the means for processing data is constructed and arranged to identify a leak in the system when $DP_t \neq DP_0$.

14. The system of claim 12, further comprising an equalization valve disposed between the tank and the means for receiving liquid fuel constructed and arranged to balance the pressure and liquid fuel level in the means for receiving liquid fuel and the tank to ensure that the DP is equal to 0.

15. The system of claim 14, wherein the means for processing data is constructed and arranged to identify a leak in the system when $DP_t \neq 0$.

16. The system of claim 14 wherein the equalization valve is provided in a housing of the means for receiving liquid fuel, the housing being coupled to and extending outside of the tank.

17. The system of claim 16, wherein the means for processing data is a processor provided in the housing.

18. The system of claim 12, wherein the means for processing data is a processor that is part of the leak detection valve.

* * * * *